(12) United States Patent
Lee

(10) Patent No.: US 6,349,695 B1
(45) Date of Patent: Feb. 26, 2002

(54) ARTICULATED VANE ROTARY INTERNAL COMBUSTION MACHINE

(76) Inventor: Charles Matthew Lee, 837 Spence Cir., Virginia Beach, VA (US) 23462

( * ) Notice: Subject to any disclaimer, the term of this patent is extended or adjusted under 35 U.S.C. 154(b) by 0 days.

(21) Appl. No.: 09/758,811

(22) Filed: Mar. 5, 2001

(51) Int. Cl.$^7$ ................................................ F02B 53/04
(52) U.S. Cl. ........................ 123/227; 123/224; 123/221
(58) Field of Search ................................ 123/204, 221, 123/223, 224, 227

(56) References Cited

U.S. PATENT DOCUMENTS

| | | | | |
|---|---|---|---|---|
| 2,263,275 A | * | 11/1941 | Pieper | 123/227 X |
| 3,352,291 A | * | 11/1967 | Brown | 123/227 |
| 4,854,279 A | * | 8/1989 | Seno | 123/204 |
| 5,709,188 A | * | 1/1998 | Al-Qutub | 123/204 |
| 6,024,549 A | * | 2/2000 | Lee | 123/204 |

* cited by examiner

Primary Examiner—Hoang Nguyen

(57) ABSTRACT

An internal combustion rotary power machine which functions in general accordance with the principles of the Carnot heat engine cycle without dependence upon reciprocating pistons, valves or other reciprocating mechanical components for working fluid manipulation. Through elimination reciprocating components the machine potentially offers a large measure of functional excellence in terms power density, efficiency, reliability, mechanical simplicity and production economy. Combustion occurs as a continuously sustained process thereby significantly facilitating the use of gaseous fuel. The machine presented in this disclosure is based on substantial analysis of the functional principles of internal combustion rotary vane machines as related to thermodynamic efficiency, mechanical efficiency, and thermal control considerations. The disclosure demonstrates the integration of primary geometric relationships and technical features necessary to effectively fulfill functional viability requirements.

1 Claim, 10 Drawing Sheets

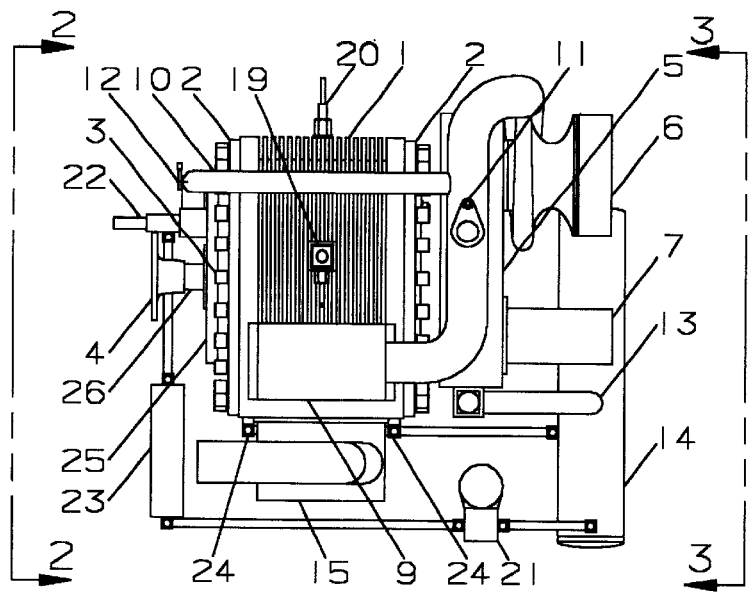
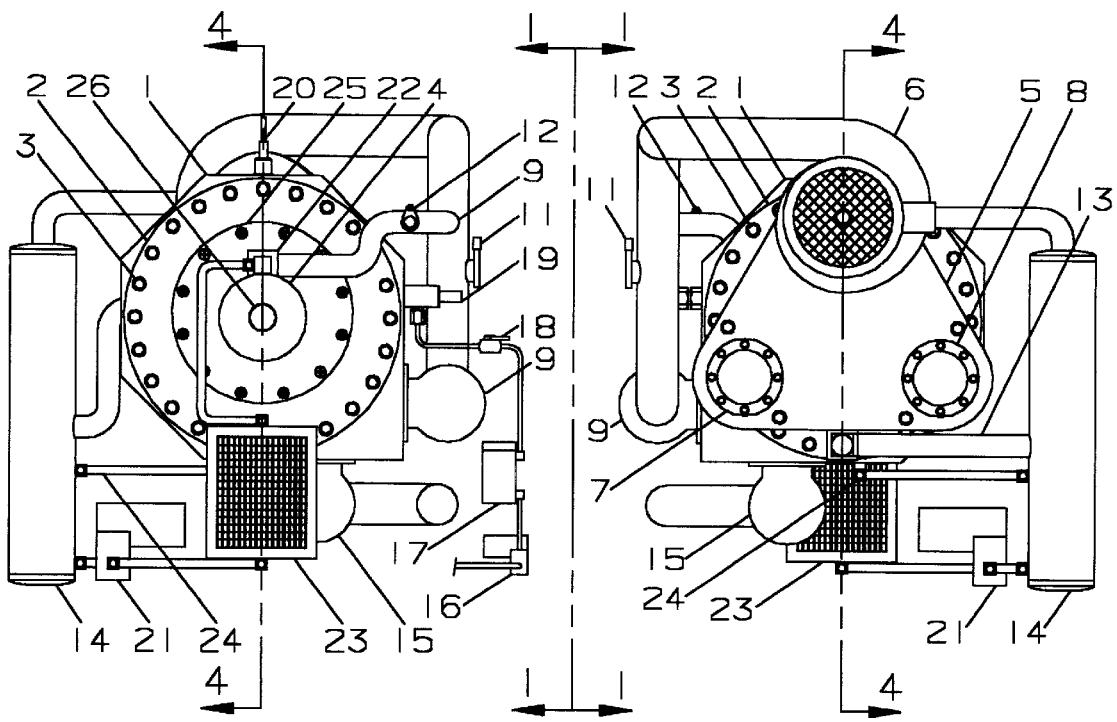
FIG. 1
FIG. 2
FIG. 3

ARTICULATED VANE ROTARY INTERNAL COMBUSTION MACHINE

CROSS REFERENCE TO RELATED APPLICATIONS

Not applicable

STATEMENT REGARDING FEDERALLY FUNDED RESEARCH OR DEVELOPMENT

Not applicable

REFERENCE TO A MICROFICHE APPENDIX

Not applicable

BACKGROUND OF THE INVENTION

At the present time, machines employed for the production of mechanical energy by internal combustion of organic fuel consist primarily of mechanical displacement machines, generally called "reciprocating" engines, and gas turbines.

Reciprocating internal combustion machines employ reciprocating mechanical motion of pistons and valves for working fluid manipulation and fuel combustion is a pulsed, non-continuous, process. The function of a reciprocating internal combustion engine is theoretically described in terms of a thermodynamic cycle such as first postulated by Sadi Carnot (1824) or one of the alternative thermodynamic cycles such as postulated by Nicholas Otto (1876), and Rudolph Diesel (1892). Gas turbines employ purely rotational components, aerofoil surfaces, and aerodynamic interaction for working fluid manipulation and fuel combustion is a self-sustaining continuous process. In general, gas turbines theoretically function in accordance with a thermodynamic cycle such as postulated by G. B. Breyton (1876).

Reciprocating machines offer an operationally flexible, relatively high torque power source and are economically satisfactory for many commercial applications, however their featured reciprocating components and pulsed combustion are inherent sources of undesirable noise and vibration. In comparison, gas turbine machines offer a relatively high rotational speed power source, and, relatively, reduced emissions of noise and vibration but offer economic superiority only in applications requiring relatively high measures of power density and delivered power.

Over a number of years significant inventive effort has been directed toward the derivation of a "rotary" internal combustion machine such as would feature mechanical displacement for working fluid manipulation but employ only rotationally dynamic components to accomplish fluid manipulation. By retention of the mechanical displacement means for working fluid manipulation the "rotary" machine is perceived to offer the performance characteristics given by reciprocating type machines, but, through elimination of reciprocating components, preclude their concomitant mechanical complexity and potential for emission of noise and vibration. The radial vane type rotary machine has been the subject of particular attention in this regard.

Conceptually the rotary vane machine primarily consists of a stationary containment structure and an internal assembly of rotationally dynamic components. The stationary containment structure consists of a containment cylinder with a precisely or approximately circular bore, installed with end closure structures. Ports are installed for induction of combustion air and for discharge of combustion products through the boundary of said containment structure.

The internal assembly of rotationally dynamic components primarily consists of a rotational armature, a plurality of radial vanes, and a means for extracting rotary power. Said rotational armature is precisely or approximately circular in cross section. The diameter of said rotational armature is less than the bore diameter of said containment cylinder such as to create an annular cavity between the peripheral surface of said rotational armature and the bore of said containment cylinder. Said rotational armature is fitted with a plurality of radial slots equally spaced around its periphery and parallel to its longitudinal axis. Each said slot accommodates and provides annular sliding support for one radial vane. Each said radial vane is a relatively thin structural panel axially extending through the armature length and radially extending from within said slot to contact or closely approach the bore of said containment cylinder. The plurality of said radial vanes subdivides the volume of aforesaid annular cavity into a plurality of annular segmental cells. Said rotational armature is supported such as to rotate on an axis parallel to, but radially displaced from the bore axis of said containment cylinder. Since the rotational axis of said rotational shaft is radially displaced from the bore axis of said containment cylinder, the relative volume of any given segmental cell is dependent upon its orbital location and, therefore, cyclically changes through rotation of said rotational armature. Said rotationally related cyclical change in relative volume functionally equates to the change in relative volume caused by the reciprocation of a piston within a cylinder such as employed in reciprocating type internal combustion and provides the basic features of working fluid manipulation necessary for the function of a heat engine cycle. For a given set of said containment cylinder proportions, the manipulated volume is inversely influenced by the diameter of said armature. Within certain limits, the compression ratio or expansion ratio of the volumetric cycle is directly influenced by both the number of segmental cells surrounding said rotational armature and the distance separating the rotational axis of said rotational armature from the bore axis of said containment cylinder. Said compression ratio is also influenced by the angular width and radial location of the sector allocated for the combustion air supply port. Similarly the expansion ratio is influenced by the angular width and radial location of the sector allocated for the combustion product discharge port. Means for extracting rotary power from the machine may consist of an axial extension of said rotational armature through one or both aforesaid end closure structures or by means of a rotational shaft functionally integrated with said rotational armature.

A number of patents have been awarded for rotary vane internal combustion machine concepts. However, despite the potentially excellent qualities offered by the rotary vane machine, as of this writing none of the concepts presented in prior art are known to have matured sufficiently to demonstrate practical utility. It may be reasonably hypothesized that the reason for such non-maturation is the result of singular or compounded inadequacies regarding functional viability considerations.

As known to persons skilled in the art, the fundamental functional viability of all machines is their capability to function within the constraints of common natural laws as defined in mechanics, physics, and mathematics. It is also known to persons skilled in the art that, beyond these fundamental considerations, the functional viability of an energy related machine is demonstrated by its capability to meet thresholds for efficiency, and power density within constraints of imposed by the physical properties of economically available constituent materials. The overall efficiency of thermal machines is the product of thermodynamic cycle efficiency and mechanical efficiency. The physical properties of constituent materials such as dimensional stability and lubricity may be significantly influenced by thermal environment. For these reasons the potential functional viability of a thermal machine may be theoretically assessed by analysis of its functional geometry and components features relative to thermodynamic cycle efficiency, mechanical efficiency, and thermal control considerations.

For internal combustion machines thermodynamic cycle efficiency is directly influenced by the compression ratio of the volumetric cycle. For machines based on Carnot principles, and with numerically equal compression and expansion ratios, the basic relationship between cycle efficiency ("Air Standard Efficiency") and compression ratio is described as:

$$\eta_c = 1 - \frac{1}{v^{(k-1)}}$$

Where: $\eta_c$ = Cycle Efficiency
$v$ = Compression Ratio
$k$ = Universal Gas Constant As previously noted, the compression ratio of a rotary vane machine is directly related to the plurality of the annular segmental cells surrounding the armature and inversely influenced by the relative angular extent of the induction port sector. Finite numerical analysis demonstrates that the threshold for adequate cycle efficiency is attained only when the plurality of radial vanes exceeds a certain minimum value and the angular extent of the induction port sector is less than a certain maximum value.

Mechanical efficiency is essentially the measure of mechanical energy conservation exhibited by a mechanism in the process of doing work. Mechanical efficiency is inversely influenced by the quantity of energy dissipated by frictional interaction between dynamically related components and, in this context, may be expressed as:

$$\eta_m = \frac{P_i - P_f}{P_i}$$

Where: $\eta_m$ = Mechanical Efficiency
$P_i$ = Input Power
$P_f$ = Power Consumed by Friction Power consumed by internal friction is the sum of the increments of power consumed by individual frictional components. In radial vane type rotary machines the radial vanes create the preponderance of the dynamically active mechanical interfaces and are, thereby, a particularly significant potential cause of power loss due to friction. Potential friction sources are; peripheral edge friction caused by sliding contact of said radial vanes with bore of said containment cylinder, axial end friction caused by sliding contact of axial ends of said radial vanes with non-rotating end closure components, and radial friction caused by sliding contact of the faces of said radial vanes with the supporting surfaces of said rotational armature. The magnitude of energy loss due to friction is also significantly influenced by the nature of the materials in sliding contact and the effectiveness of lubrication at the contact surface. Finite numerical modeling demonstrates that, in the plurality necessary to achieve thermodynamic cycle viability, the radial vanes alone could, potentially, incur friction losses of sufficient magnitude as to cause non-viability from a mechanical efficiency viewpoint. Minimization of the potential contributions of mechanical friction from all sources is therefore a vital consideration regarding the functional viability of rotary vane machines.

Machine component temperature is a source of concern from thermal expansion, component flexure, friction, and bearing life viewpoints. Dynamic components of internal combustion machines are exposed to heating from three sources, adiabatic heating due to gas compression, heat released by fuel combustion, and heat produced by the work done in overcoming friction. For this reason the functional viability of internal combustion machines is dependent upon adequate means for environmental control. Environmental control normally consists of the movement of liquid and/or gaseous heat extraction media across component surfaces. In general, the rate of heat extraction is directly influenced by the area of structural surface exposed to heat extraction media and flow rate of said heat extraction media across said structural surface. Extraction of waste heat from stationary components of reciprocating machines is accomplished by exposure of external surfaces to ambient air or liquid heat extraction media. Extraction of waste heat from the stationary enclosures of rotary vane machines may be readily accomplished by similar means. Environmental control for internal dynamic components is normally accomplished by circulation of air and liquid lubricant. In the case of reciprocating machines environmental control of dynamic internal components is facilitated by their functional assembly which precludes exposure of many components to high temperature working fluid and contains them within a stationary crankcase structure and thus readily accessible for internal circulation of environmental control media. In comparison the internal dynamic components of rotary vane machines are, relatively, more substantially exposed to contact with high temperature working fluid and their functional assembly makes them significantly less accessible for internal circulation of environmental control media. For these reasons the means for maintaining environmental control within the interior of the machine assembly is a vital consideration regarding the functional viability of rotary vane machines.

Several prior rotary vane machine disclosures present technical approaches toward minimization of friction particularly as related to sliding friction between radial vanes and containment cylinder bore but in general are substantially silent regarding the other functional viability issues discussed above. Principal features of several rotary vane type machines disclosed in prior patents are briefly reviewed below.

U.S. Pat. No. 2,590,132 issued to F. Scognamillo on Mar. 25, 1952 discloses a rotary cylinder rotary device. Said device features a stationary housing with an internal circular bore, end closure structures, and fluid transfer ports. Within said stationary housing a solid rotor is concentrically secured to a rotational shaft. Said rotational shaft is radially and axially constrained by two rotational bearings with one bearing installed in each said end closure structure. Said rotor is fitted with a plurality of axial slots uniformly distributed around its periphery. Each said rotor slot annularly constrains one radial vane such as to permit relative sliding motion. Each said radial vane is installed with a cylindrical extension at each end. Said cylindrical extensions engage a rotating ring at one end and a rotating disk at the other such as to radially constrain said radial vane. Said radial vane is constrained such that its outer peripheral edge remains a small distance from the said circular bore at all rotational positions. A spring loaded sliding seal is installed on the radial periphery of each said radial vane such as to maintain pressure contact with the circular said bore. Said rotating ring and said rotating disk are concentrically and mechanically connected by means of an annular cylinder. Said rotating ring, rotating disk, and annular cylinder assembly is and axially and radially constrained by a rotational bearing installed in one said end structure. Axial aligned sealing strips are installed on the outer periphery of said annular cylinder such as to maintain sliding contact with the circular said bore. Said annular cylinder is fitted with axial slots such as to permit radial passage of said radial vanes. Said radial vanes are axially constrained by contact with said rotating ring at one end and with said rotating disk at the other. Issues related to lubrication, and heat extraction are not discussed.

U.S. Pat. No. 5,568,796 issued to William R Palmer on Oct. 29, 1996 discloses a rotary compressor and engine machine system Said disclosure features a stationary housing with an internal non-circular bore, end closure structures and fluid transfer ports. Within the stationary housing a plurality of radial vanes is radially constrained by means of pivotal bearings installed on a rotating hub. Said radial vanes extend through a rotating circular annulus such as to closely approach the bore of said stationary housing. Said annulus are installed on rotational bearings such that said annulus rotates on an axis parallel to but separate from the rotational axis of the said hub. Said hub and said annulus synchronously rotate by means of gearing. The bore of said stationary housing is contoured such that the free ends of said radial vanes remain a constant distance from the bore of the said stationary housing. Seals are installed on the free edges of the said radial vanes to close the gap between the free edges of said radial vanes and the said stationary housing. The disclosure demonstrates that one said assembly can fulfill the expansion and discharge phases of a heat engine cycle, one said assembly can fulfill the induction and compression phases of the said heat engine cycle, and coupling of two said assemblies can fulfill all of the four required phases of a heat engine cycle. The disclosure is silent regarding means for sealing the axial ends of rotational components, centrifugal restraint of vane edge seals and issues related to lubrication, extraction of waste heat, and accommodation of functionally related geometric variations.

U.K. Pat. No. 468,390 issued to Drehkolben Kraftsmachinen G.m.b.H on Jul. 2, 1937 discloses improvements in and relating to rotary piston machines. Features presented in this disclosure consist of means by which uninterrupted combustion of fuel can take place at constant pressure, a means by which rotary machines can be made to function by combustion of different fuel types (e.g. pulverized coal), and a means by which throttle like devices may be installed on either the induction or the expansion side of a rotary machine for the purpose of performance control. The disclosure also presents methods by which two rotary vane devices may be non-mechanically coupled such as to collectively function such as to fulfill the four required phases of a heat engine cycle. The disclosure drawings illustrate a rotary device consisting of a stationary containment cylinder, a solid rotor installed on a rotational shaft, fitted with six radial slots and accommodating six radial vanes. The disclosure is silent regarding the mechanical features of the rotary vane device and issues related to extraction of waste heat and lubrication.

BRIEF SUMMARY OF THE INVENTION

This disclosure presents a rotary vane internal combustion machine for efficient conversion of chemical energy, as contained in liquid or gaseous fuels, to rotational energy suitable for accomplishing mechanical work. Functional characteristics such as rotational velocity and power density are, in general, comparable to the functional characteristics of modern reciprocating internal combustion machines, however functional efficiency is enhanced by elimination of major reciprocating components, minimization of mechanical friction, and utilization of a continuously sustained combustion process. The machine primarily consists of a stationary containment structure and an internal assembly of rotationally dynamic components.

The stationary containment and foundation structure consists of a containment cylinder with circular bore installed with a closure structure at each axial end. Ports are installed for induction of combustion air and for discharge of combustion products through the wall of said containment cylinder. Said induction and discharge ports are mutually interspersed throughout the axial length of the aforesaid stationary containment cylinder, peripherally dispersed such as to minimize their collective sector width, and radially oriented such that their respective flow streams maximize working fluid manipulation efficiency. Ports are for introduction of fuel, externally supplied energy, and ports for maintaining combustion as a sustained continuous process are incorporated in the structural wall of said containment cylinder.

The internal assembly of rotationally dynamic components primarily consists of a rotational armature, a rotational shaft and a plurality of radial vanes. Said rotational armature features a circular cross section and a hollow core. The outside diameter of said rotational armature is approximately ninety percent of the bore diameter of aforesaid containment cylinder thus creating an annular cavity between the peripheral surface of the said armature and the said bore of aforesaid containment cylinder. Said rotational armature is simply supported by low friction rotational bearings installed in aforesaid end closure structures and rotates on an axis parallel to but radially separated from the bore axis of aforesaid containment cylinder. The annulus of said rotational armature accommodates a plurality of axially aligned radial slots uniformly distributed around its periphery. Each said radial slot is installed with one radially sliding radial vane and a pair of radially extending compression springs. Said radially extending compression springs are installed such as to exert a radially outward force on the associated said radial vane. An articulated extension is secured to the innermost edge of each said radial vane and to the periphery of said rotational shaft by means of hinged connections. Said rotational shaft is simply supported by, and extends through, a low-friction rotational bearing installed in each aforesaid end closure structure. Axial ends of said rotational shaft are configured to facilitate transmission of rotational power to external power consuming systems. The axis of rotation of said rotational shaft is coincident with the bore axis of said containment cylinder. The radial widths of said radial vanes and said articulated extension are selected such as to preclude contact between the outer edges of said radial vanes and the bore of said containment cylinder. By this means the centripetal force induced by each radial vane upon high-speed rotation of said armature is reacted by said rotational shaft and not through sliding contact with the bore of said containment cylinder. A mechanical radial vane edge seal installed on the outermost edge of each said radial vane exerts a nominal spring force on the bore of aforesaid containment cylinder. Said radial vanes and said radial vane edge seals subdivide the said annular cavity into a number of annular segmental cells.

Axial ends of said annular segmental cells are closed by means of rotational assemblies consisting of a sealing ring, axial spring, and retainer ring components installed at each end of said rotational armature. Said sealing ring, axial spring, and retainer ring assemblies resiliently respond to axial component geometry adjustments such as caused by thermal variations. Since the rotational axis of said rotational armature is radially displaced from the bore axis of aforesaid containment cylinder, the relative volume of any given segmental cell is dependent upon its orbital location and, therefore, will cyclically change upon rotation of said armature. The described mechanism therefore fulfills the fundamental requirements for physical manipulation of working fluid necessary to achieve a functional heat engine thermodynamic cycle and, with selection of appropriate geometric relationships, support systems, and design details, be evolved to function as an internal combustion machine.

The internal axial cavity in aforesaid rotational armature provides a means for delivering environmental control media to internal dynamic components. Contouring the internal peripheral surface of the said internal axial cavity such as to enlarge the surface area exposed to environmental control media facilitates extraction of heat from said rotational armature and interfacing components. Environmental control media are supplied to and discharged from said internal axial cavity by means of ports installed in the aforesaid end closure structures.

Necessary ancillaries consist of an air supply fan, fuel delivery system, an externally powered rotational device to initiate machine rotation, an electrically powered igniter to initiate combustion, and a liquid lubricant management system.

The internal combustion rotary machine presented in this disclosure illustrates the primary geometric relationships and other design features appropriate to obtaining the measures of thermodynamic efficiency, mechanical efficiency, and internal environmental control necessary for demonstration of functional viability.

BRIEF DESCRIPTION OF THE DRAWINGS

FIG. 1 is a side elevation of the external general assembly. For the purposes of this disclosure the axis of rotation is horizontal. The machine is illustrated with diagrammatic representations of ancillary components as deemed appropriate for general service and for combustion of liquid fuel. Special service requirements or combustion of gaseous fuel may require changes in said ancillary components but remain within the scope of this disclosure.

FIG. 2 and FIG. 3 are, respectively, left hand and right hand end views of the external general assembly relative to the elevation given in FIG. 1.

FIG. 15 also illustrates, by reference, other machine components directly interfacing with the articulated radial vane assembly.

FIG. 16 also illustrates, by reference, other machine components directly interfacing with the articulated radial vane assembly.

DETAILED DESCRIPTION OF THE INVENTION

Figure 4:
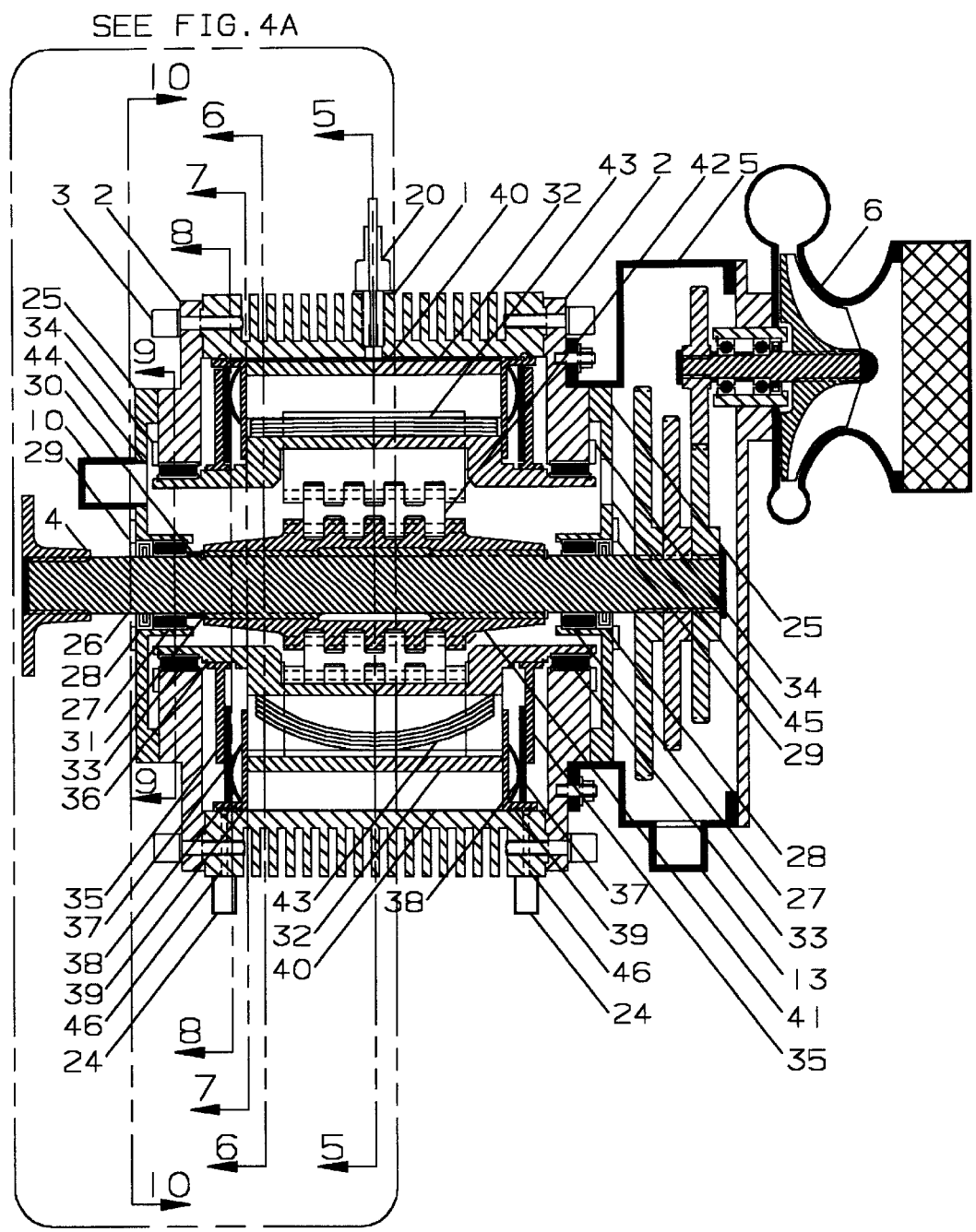
FIG. 4 illustrates the internal general assembly along the axis of rotation. Cross section indicators given in FIG. 4 define the axial locations of cross sections presented in FIG. 5 through FIG. 10.

Referring to FIG. 1, FIG. 2 and FIG. 3, containment cylinder 1 and end closure structures 2 are the principal stationary containment and foundation components. Said containment cylinder features a set of closely spaced fins to promote dissipation of waste heat to ambient atmosphere, alternatively, waste heat may be removed by circulation of heat extraction liquid through integral structural passageways. Said end closure structures 2 are secured to said containment cylinder 1 by means of machine screws 3. Flange coupling 4 provides the interface for the conduit of rotational mechanical energy to an external power transmission system. Integral gearbox 5 drives air supply fan 6 to provide air for combustion and internal environmental control. Externally energized device 7 delivers rotational mechanical energy to said gearbox 5 for initiation of rotation. Electrical alternator 8 driven by said gearbox 5 supplies electrical energy to power auxiliary support systems. Manifold 9 provides conduit for supply of combustion air and manifold 10 provides conduit for supply of air for internal environmental control. Valve 11 controls the movement of combustion air. Valve 12 controls the movement of air for internal environmental control. Manifold 13 provides conduit for discharge of internal environmental control air to lubricant coalescer and reservoir assembly 14. Manifold 15 provides conduit for discharge of combustion product to atmosphere. Pump 16, filter 17, and valve 18 deliver a controlled supply of liquid fuel to injector 19. Said fuel injector 19 provides conduit or finely dispersed (atomized) fuel through the wall of aforesaid containment cylinder 1. Specific nature and plurality of fuel supply components are dependent upon machine size, operational requirements and characteristics of chosen fuel. Electrical igniter 20 provides thermal input as necessary to initiate combustion. Circulation pump 21, heat exchanger 23, and injector 22 deliver liquid internal environmental control lubricant to internal dynamically active components. Manifold 24 provides conduit for return of excess liquid lubricant to said coalescer and reservoir assembly 14. Bearing carrier 25 accommodates rotational bearings for support of rotational shaft 26.

Figure 4A:
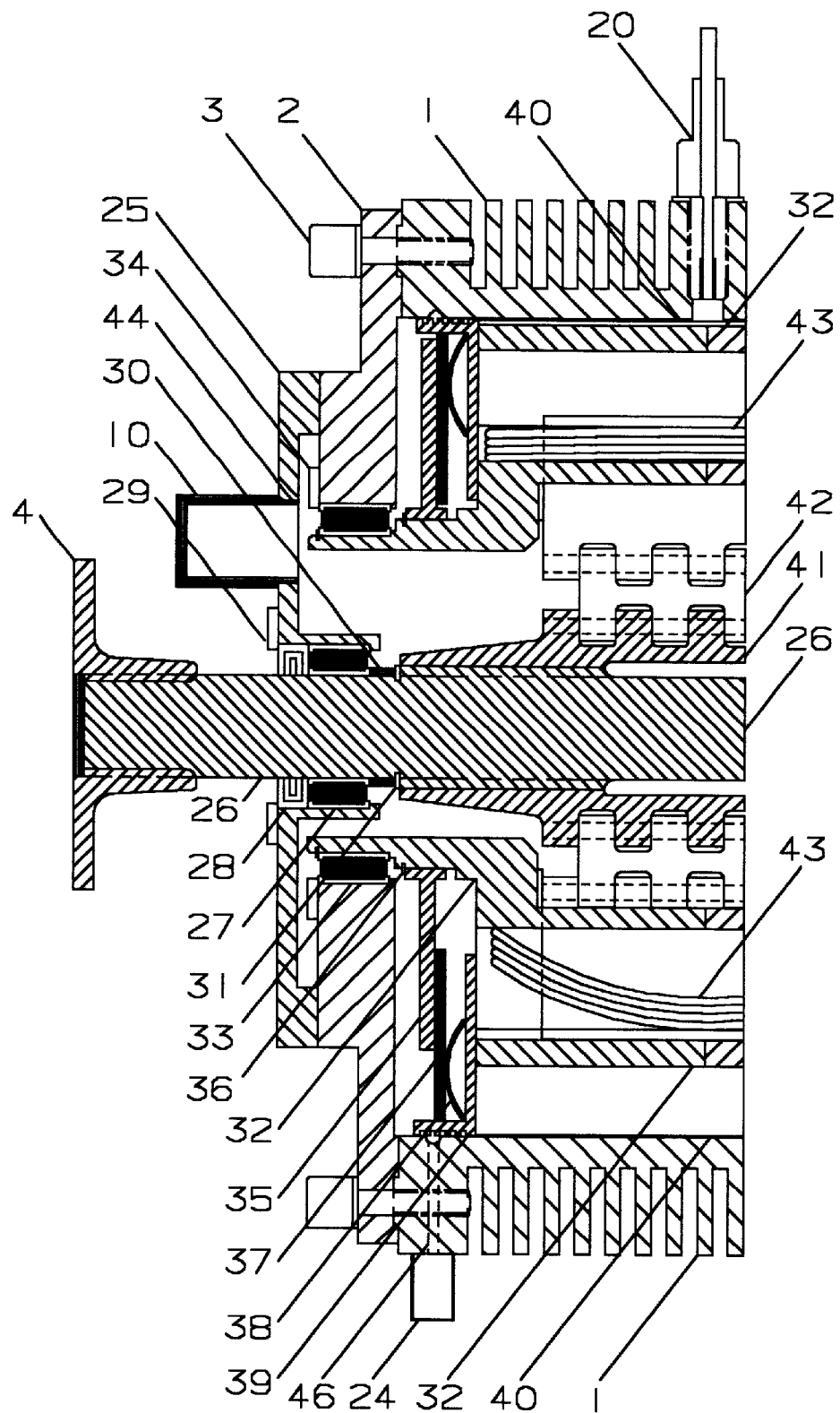
FIG. 4A is an enlarged detail of the rotational bearing arrangement shown in FIG. 4.

With reference to FIG. 4 and FIG. 4A, rotational shaft 26 is radially constrained by low-friction roller bearings 27 installed in aforesaid bearing carrier 25 such as to rotate on an axis concentric with the bore axis of aforesaid containment cylinder 1. Said low-friction rotational bearings 27 are protected from contamination by bearing seals 28 and secured within aforesaid bearing carriers 25 by bearing retainers 29. Said rotational shaft 26 is axially constrained by annular collar 30 and spring clip 31. Rotational armature 32 is a hollow annulus structure constructed from two coaxial components connected at the middle of the axial length and features a center section, which accommodates radial vane components 40, and an extension of reduced diameter at each axial end. Said rotational armature 32 is radially and axially constrained one low-friction roller bearing 33 installed within each end closure structure 2. Said rotational armature 32 rotates on an axis parallel to, but radially displaced from, the bore axis of aforesaid containment cylinder 1. Low-friction roller bearings 33 are secured within end closure structures 2 by bearing retainers 34. Axial retainer rings 35 are concentrically secured on said rotational armature 32 and axially constrained by annular spring clips 36. Wear rings 37 constrain axial compression springs 38. Said axial compression springs 38 exert a resilient axial force such as to maintain resilient, axial, contact of seal rings 39 with said rotational armature 32 and axial ends of radial vanes 40. The outer periphery of each said seal ring 39 features an axially extended annular flange fitted with circumferential channels such as to create a cascade type fluid seal between said seal ring 39 and the bore of aforesaid containment cylinder 1. Radial vane anchor sleeve 41 is concentrically secured on aforesaid rotational shaft 26 by means of a close tolerance mechanical spline connection such that said radial vane anchor sleeve 41 and aforesaid rotational shaft 26 function as a single rotational entity. Each radial vane articulated extension 42 is secured to one said radial vane 40 and to said radial vane anchor sleeve 41 by hinged connections. Radial compression springs 43 exert a resilient radial force such as to thrust each said radial vane 40 radially outward relative to said rotational armature 32. Manifold 10 and supply port 44 in association with discharge port 45 and discharge manifold 13 provide conduit for movement of internal environmental control air and atomized liquid lubricant through the machine interior. Drain ports 46 extend though the wall of aforesaid containment cylinder 1 to provide conduit for discharge of excess liquid lubricant to aforesaid discharge manifold 24.

Figure 5:
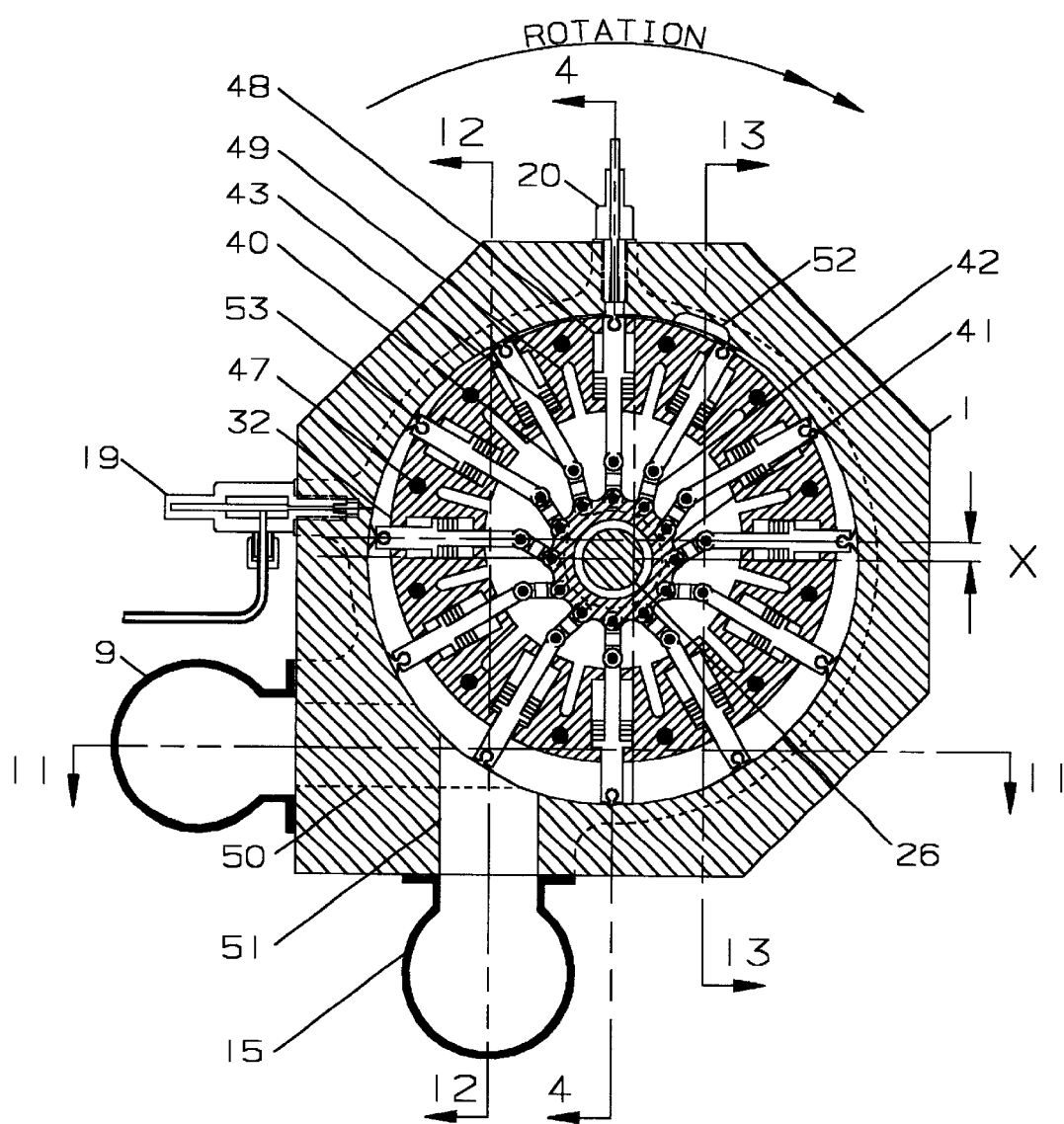
FIG. 5 is a cross section at mid-length of the containment cylinder and illustrates the primary geometric features of the rotational mechanism and the radial arrangement of combustion air induction and combustion products discharge ports, and other functionally significant system components. Section indicators given in FIG. 5 define the locations of sectional elevations presented in FIG. 11, FIG. 12, and FIG. 13.

With reference to FIG. 5, the rotational axis of rotational shaft 26 is coincident with the bore axis of aforesaid containment cylinder 1. The rotational axis of aforesaid rotational armature 32 and the bore axis of aforesaid containment cylinder 1 are separated by radial distance "X." A plurality of interference fitted dowel pins 47 mechanically secure aforesaid coaxial components of rotational armature 32. The annulus of aforesaid rotational armature 32 features a number of radial slots 48 equidistantly spaced around its outer periphery and extending radially through the annulus thickness. Each said radial slot 48 accommodates one aforesaid radial vane 40 and two aforesaid radial compression springs 43. Each said radial slot 48 is sized to closely constrain aforesaid radial vane 40 at the outer and inner peripheries of the annulus of aforesaid rotational armature 32 but allow relative sliding motion. The annulus of aforesaid rotational armature 32 also incorporates a plurality of surface area augmentation slots 49 interspaced between said radial vane slots 48. Said surface area augmentation slots 49 extend partially through the said rotational armature 32 annulus from its inner periphery and facilitate transfer of waste heat from said rotational armature 32 to internal environmental control media. Port 50 provides conduit for supply of combustion air from aforesaid combustion air supply manifold 9 through the wall of aforesaid containment cylinder 1. Port 51 provides conduit for discharge of expended combustion product through the wall of aforesaid containment cylinder 1 to aforesaid combustion products discharge manifold 15. Port 52 within aforesaid containment cylinder 1 provides conduit for hot combustion product for controlled combustion propagation. Details of combustion port arrangements are discussed in a later paragraph. Aforesaid injector 19 provides conduit for delivery of finely dispersed fuel through the wall of aforesaid containment cylinder 1 and aforesaid igniter 20 provides conduit for electrical power through the wall of aforesaid containment cylinder 1 to initiate combustion. Each aforesaid radial vane articulated extension 42 is secured to one aforesaid radial vane 40 and aforesaid radial vane anchor sleeve 41 by hinged connections. Also each aforesaid radial vane 40 is fitted with radial vane edge seal 53 at its outer periphery. Details of aforesaid radial vane 40 and associated components are discussed in a later paragraph.

Figure 6:
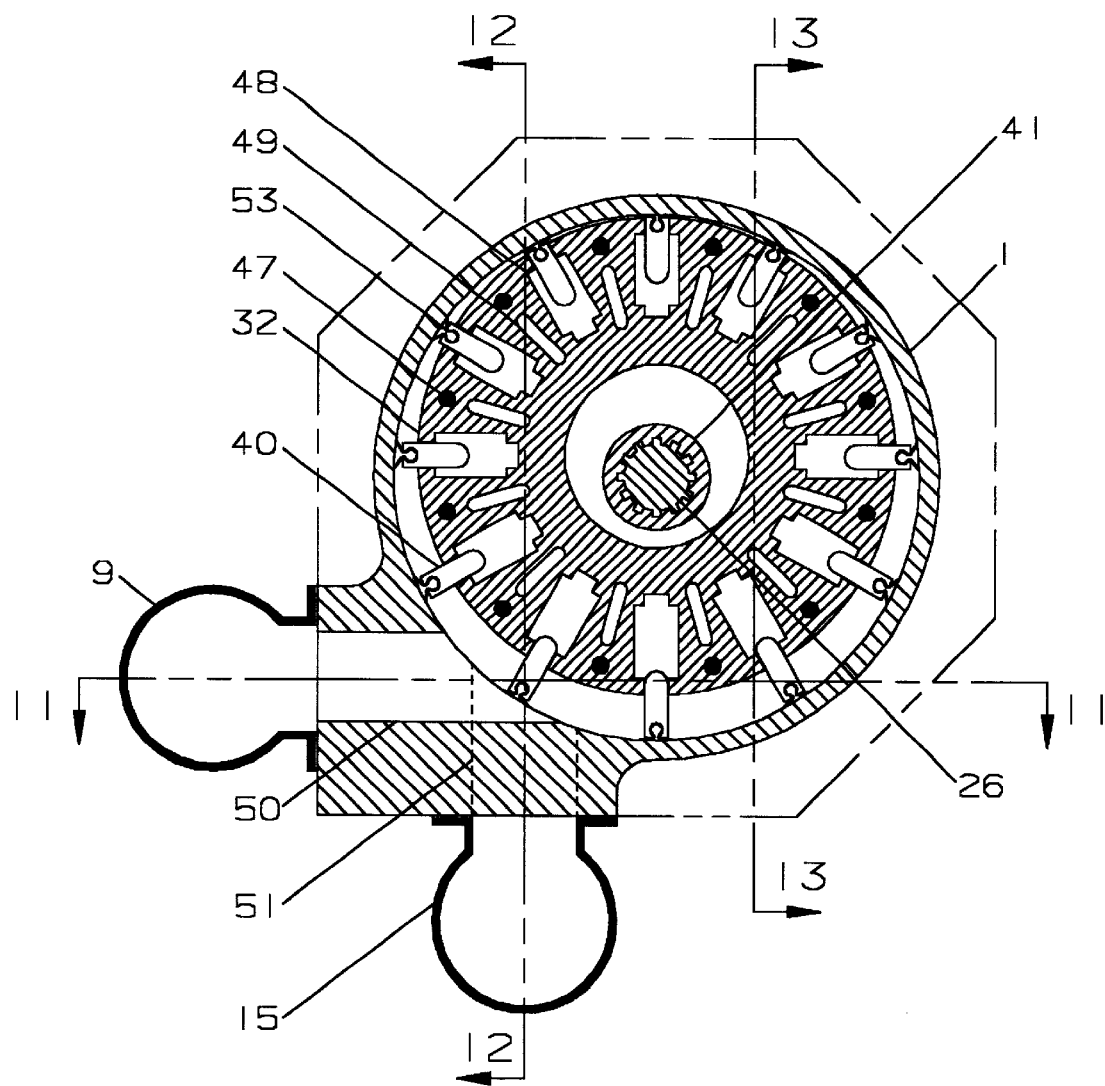
FIG. 6 is a cross section close to the end of the rotational armature and illustrates arrangements for constraint of radial vane ends.

With reference to FIG. 6, at this section the thickness of the annulus of aforesaid rotational armature 32 is increased and aforesaid radial vane slots 48 extend from the outer periphery of aforesaid rotational armature 32 partially through the annulus thickness. Aforesaid radial vanes 40 are reduced in radial width to be accommodated within the radial depth of aforesaid radial vane slots 48. Aforesaid area augmentation slots 49 penetrate the annulus structure in an axial direction and provide conduit for discharge of excess liquid lubricant from inside aforesaid rotational armature 32. As previously noted aforesaid radial vane anchor sleeve 41 is concentrically secured on aforesaid rotational shaft 26 by a closely fitted spline connection. As previously noted, aforesaid port 50 from aforesaid combustion air supply manifold 9 and aforesaid port 51 to aforesaid combustion products discharge manifold 15 provide conduit for movement of working fluid through the wall of aforesaid containment cylinder 1.

Figure 7:
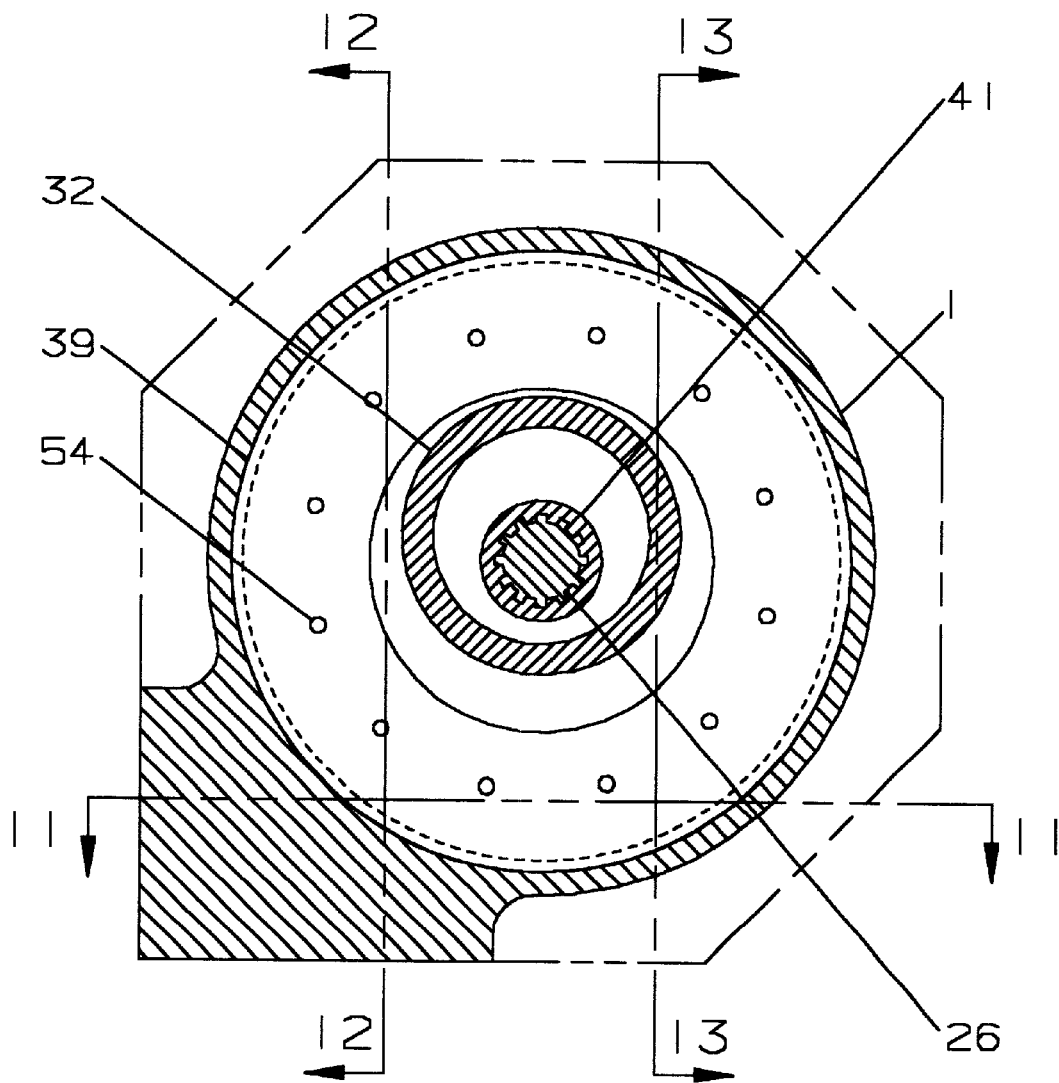
FIG. 7 is a cross section at the inside face of the rotational axial end sealing assembly and illustrates the ports for discharge of excess lubricant from within the armature cavity.

With reference to FIG. 7, at this section the inner and outer diameters of aforesaid rotational armature 32 are reduced. The outer periphery of aforesaid axial seal ring 39 maintains a close tolerance, rotationally sliding fit with the bore of aforesaid containment cylinder 1. The inner periphery of aforesaid axial seal ring 39 is sized to permit radial clearance from the outer periphery of aforesaid rotational armature 32. Ports 54 installed in the face of aforesaid seal ring 39 provide conduit for discharge excess liquid lubricant from within the rotational assembly. As previously noted aforesaid radial vane anchor sleeve 41 is concentrically secured on aforesaid rotational shaft 26 by a closely fitted spline connection.

Figure 8:
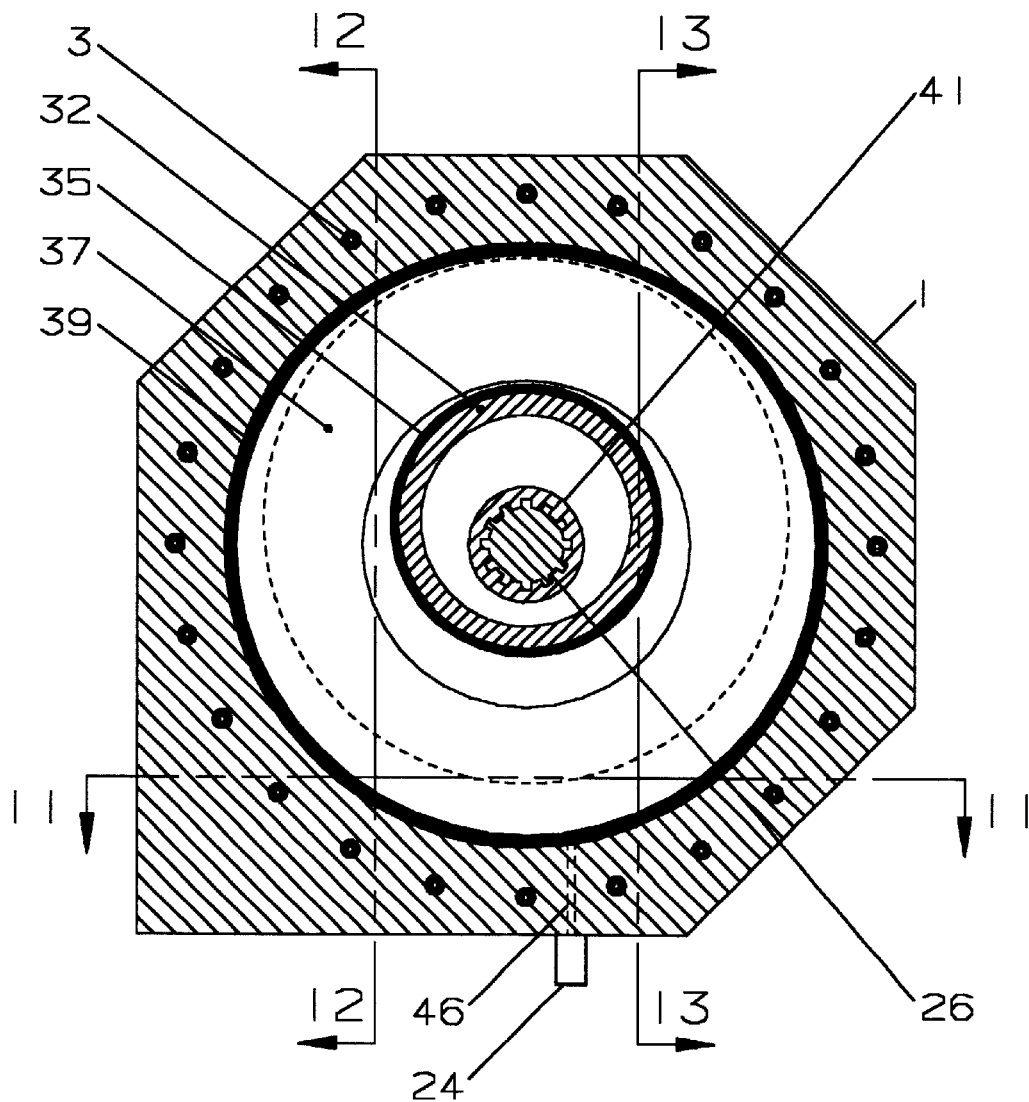
FIG. 8 is a cross section through the rotational axial end sealing assembly and primarily illustrates the interface between significant rotational components.

With reference to FIG. 8, as previously noted the outer periphery of aforesaid axial seal ring 39 maintains a close tolerance, rotationally sliding fit with the bore of aforesaid containment cylinder 1. The outer periphery of aforesaid wear ring 37 maintains a close tolerance, sliding fit with the inner periphery of the axially extended peripheral flange of aforesaid axial seal ring 39. The inner periphery of aforesaid wear ring 39 is sized to permit radial clearance from the outer periphery of the flange of aforesaid axial retainer ring 35. Aforesaid axial retainer ring 35 is concentrically installed on aforesaid rotating armature 32 with a close tolerance, sliding, fit. As noted in prior paragraphs, radial vane anchor sleeve 41 is concentrically secured on rotational shaft 26 by a closely fitted spline connection. Aforesaid port 46 and aforesaid drain manifold 24 provide conduit for the removal of excess liquid lubricant from the interior of aforesaid containment cylinder 1.

Figure 9:
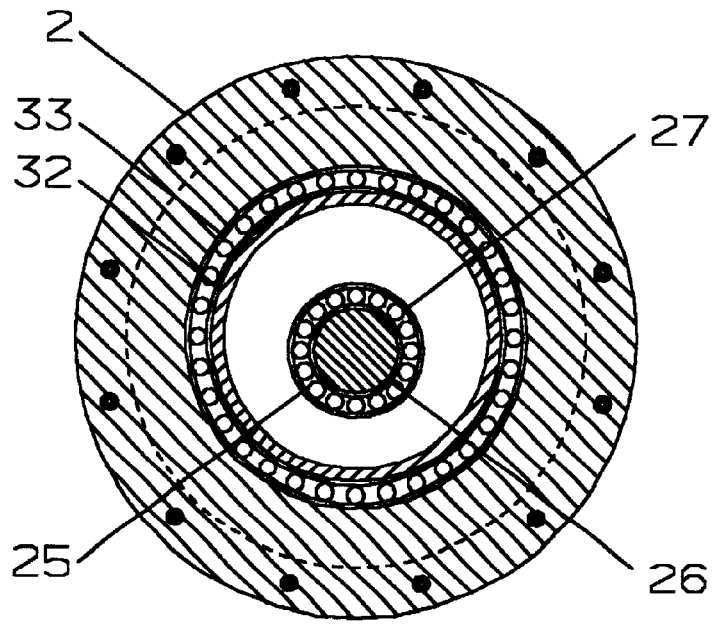
FIG. 9 is a cross section primarily through the mid-length of one end structure and illustrates the arrangement of rotational armature and rotational shaft support bearings.

With reference to FIG. 9, aforesaid containment cylinder end structure 2 accommodates aforesaid rotational bearing 33 for support of aforesaid rotational armature 32. Aforesaid rotational bearing 27 for support of aforesaid rotational shaft 26 is accommodated in aforesaid bearing carrier 25.

Figure 10:
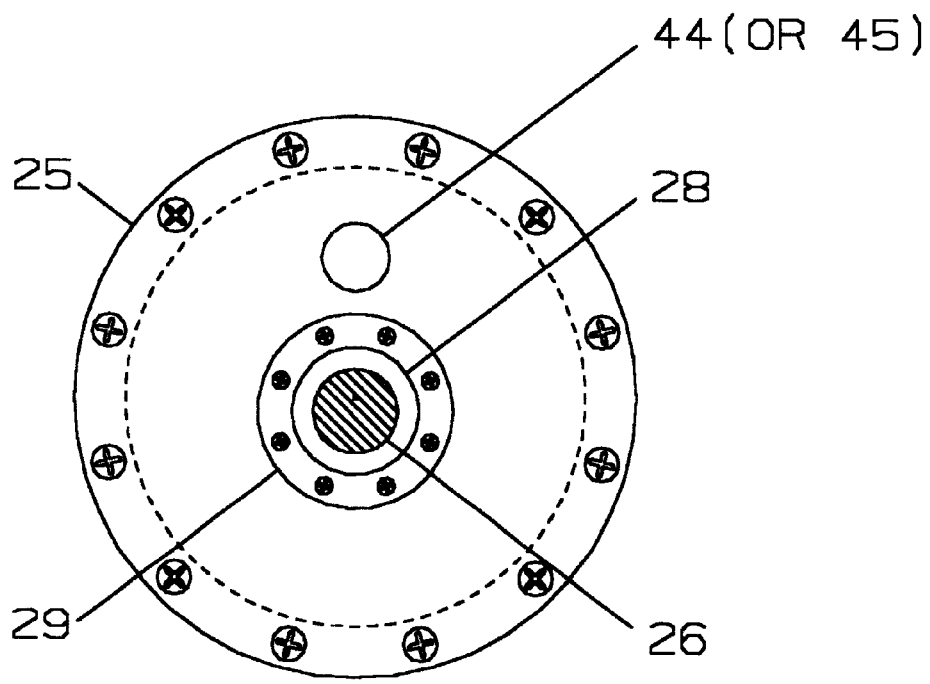
FIG. 10 is a cross section at the external face of the containment structure and illustrates the arrangement of induction/discharge ports for conduit of heat extraction media through the containment structure.

With reference to FIG. 10, rotational bearing seal retainer 29 secured to aforesaid bearing carrier 25 axially constrains aforesaid bearing seal 28 associated with aforesaid rotational shaft 26. Aforesaid port 44 provides conduit for movement of internal environmental control air and finely dispersed liquid lubricant through aforesaid bearing carrier 25 to the internal mechanical assembly.

Figure 11:
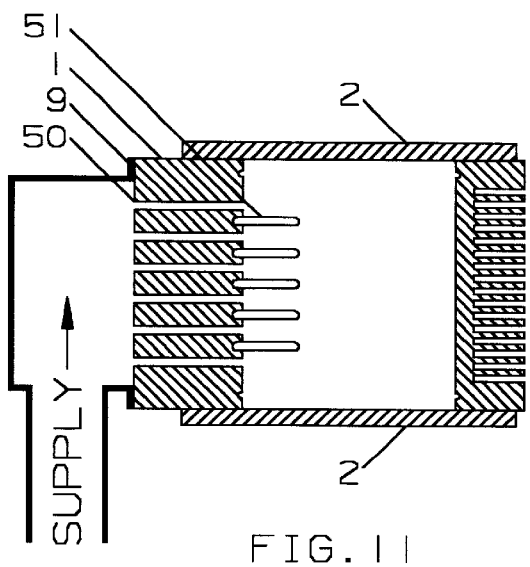
FIG. 11 is a section through the stationary containment cylinder and end closure structures to illustrate the geometric arrangement of the combustion air supply port and combustion product discharge port relative to the combustion air supply manifold.

With reference to FIG. 11, aforesaid port 50 consists of a plurality of openings uniformly distributed throughout the axial length of containment cylinder 1 and provides conduit for combustion air from aforesaid combustion air supply manifold 9 through the wall of aforesaid containment cylinder 1. The elongated openings of aforesaid combustion products discharge port 51 are interspersed between the openings of aforesaid combustion air supply port 50.

Figure 12:
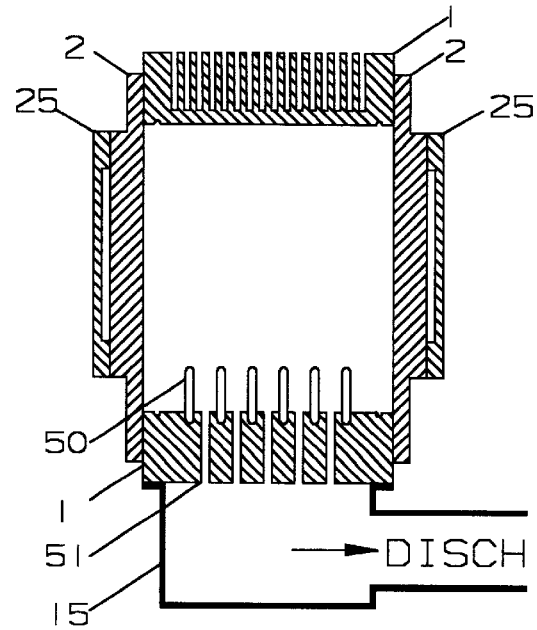
FIG. 12 is a section through the stationary containment cylinder and end closure structures to illustrate the geometric arrangement of the combustion air supply port and combustion product discharge port relative to the combustion product discharge manifold.

With reference to FIG. 12, aforesaid port 51 consists of a plurality of openings uniformly dispersed throughout the axial length of containment cylinder 1 and provides conduit for combustion product through the wall of containment cylinder 1 to discharge manifold 15. The elongated openings of aforesaid combustion air supply port 50 are interspersed between the openings of aforesaid combustion products discharge port 51.

Figure 13:
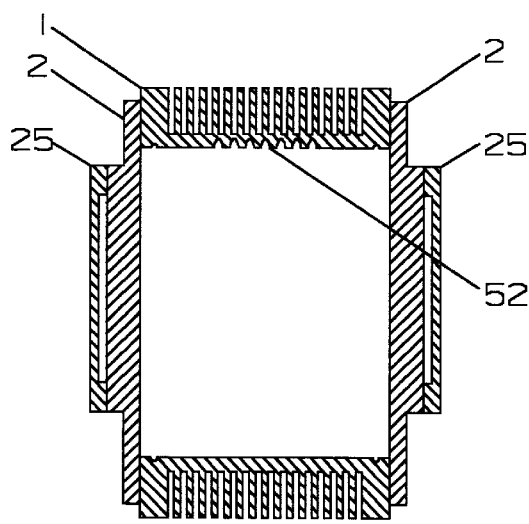
FIG. 13 is a section through the stationary containment cylinder and end closure structures to illustrate the geometric arrangement of the continuous combustion port.

With reference to FIG. 13, aforesaid continuous combustion port 52 consists of a plurality of peripheral channels installed in the bore periphery and uniformly dispersed throughout the axial length of aforesaid containment cylinder 1.

Figure 14:
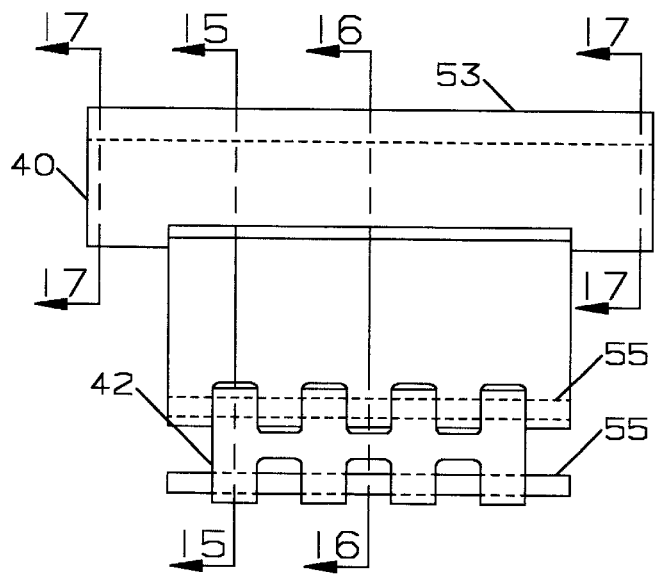
FIG. 14 is an elevation of one radial vane to illustrate significant geometric and assembly features of the vane and its directly associated components.

With reference to FIG. 14 each radial vane assembly consists of an aforesaid radial vane 40, an aforesaid radial vane articulated extension 42, and an aforesaid radial vane edge seal 53. The aforesaid radial vane is connected to the aforesaid radial vane articulated extension 42 by a hinge type connection secured by a hinge pin 55.

Figure 15:
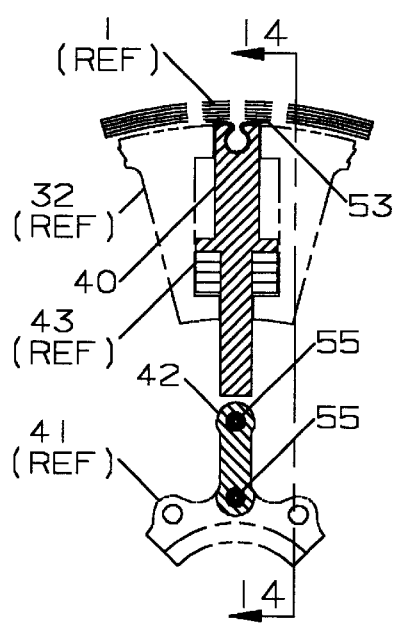
FIG. 15 presents a section through one radial vane at mid-length and illustrates the articulated radial vane assembly.
Figure 16:
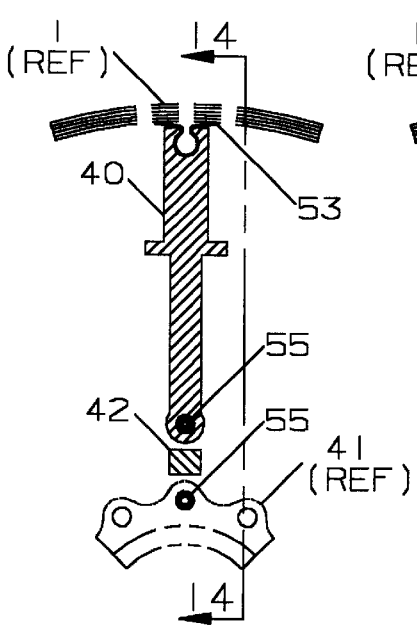
FIG. 16 presents a section through one radial vane and illustrates the articulated radial vane assembly at the quarter-length.

With reference to FIG. 15 and FIG. 16, aforesaid radial vane 40 features a material concentration on its radially outermost axial edge to accommodate an aforesaid vane-edge seal 53. Aforesaid radial vane edge seal 53 engages the outer peripheral edge of each said radial vane 40 by means of a closely fitted, journal bearing type, interface sized to allow partial relative rotation. Aforesaid radial vane edge seal 53 is a relatively thin spring-grade steel structure axially bifurcated on its outer peripheral edge such as to maintain resilient contact with the bore of aforesaid containment cylinder 1. Aforesaid radial vane 40 also features a material protrusion on each side to engage aforesaid radial compression springs 43. Aforesaid radial vane articulated extension 42 is a quasi-rectangular panel structure connected to the aforesaid radial vane 40 and aforesaid radial vane anchor sleeve 41 by hinge type connections with each connection secured by one aforesaid hinge pin 55.

Figure 17:
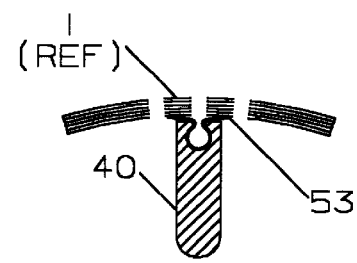
FIG. 17 presents a section of one radial vane close to its axial end.

With reference to FIG. 17, beyond the axial limits of hinged length, the radial breadth of aforesaid radial vane 40 is reduced. The aforesaid radial vane edge seal 53 is incorporated as previously discussed.

I claim as my invention:

1. A rotary vane internal combustion machine for the production of rotational mechanical energy and comprising:

a stationary containment cylinder featuring a circular bore, installed with radially oriented and axially interspersed ports for conduit of combustion air and combustion products, and installed with ports for conduit of fuel, for combustion initiation, and for propagation of sustained combustion;

an end closure structure mechanically secured at each axial end of aforesaid containment cylinder with each said end closure structure installed with a port for conduit of media for thermal control and lubrication of internal components;

a rotational armature configured as a structural annulus with circular cross section and with a hollow rotational armature extension of smaller diameter integrally and coaxially secured at each axial end;

a radial vane slot installed on each of twelve centers uniformly distributed around the circumference of aforesaid rotational armature with said radial vane slot proportioned to extend through the axial length and through the radial thickness of said rotational armature and with said radial vane slot configured to accommodate one radial vane and its associated radially extending compression springs;

a radial slot installed in the inner periphery of aforesaid structural annulus at each of twelve centers with each said center equally distanced from each adjacent aforesaid radial vane slot and with each said radial slot proportioned to axially extend through the length and partially through the radial thickness of said rotational armature;

a rotational armature support bearing secured in each aforesaid end closure structure with each said rotational armature support bearing proportioned and aligned to radially and axially constrain one aforesaid rotational armature extension on a rotational axis parallel to but radially separated from the bore axis of aforesaid containment cylinder;

a radial vane individually installed within each aforesaid radial vane slot, with said radial vane proportioned to extend through the axial length and transverse width of aforesaid radial vane slot, and with one axial edge configured as one side of a pivotal hinge, one axial edge configured to accommodate a vane edge seal, and each side configured to feature an axially aligned and integrally secured radially extending spring retainer;

a radially extending compression spring, individually installed on each side of each aforesaid radial vane within each aforesaid radial vane slot with said radially extending compression spring configured and proportioned to resiliently constrain aforesaid radial vane radially outward relative to the rotational axis of aforesaid rotational armature;

a radial vane edge seal individually installed on the radially outermost axial edge of each aforesaid radial vane, with said radial vane edge seal featuring an axial bifurcation on its outermost axial edge and proportioned to extend through the axial length of aforesaid radial vane and maintain resilient contact with the bore of aforesaid containment cylinder;

a radial vane extension individually and mechanically secured on the inner axial edge of each aforesaid radial vane with each axial edge of said radial vane extension configured as one side of a pivotal hinge, with the axial length of each said radial vane extension proportioned to extend through the axial length of aforesaid radial vane, and with the radial width of each said radial vane extension proportioned to maintain a small distance of separation between the radially outermost axial edge of each aforesaid radial vane and the bore of aforesaid containment cylinder;

a rotational shaft proportioned to axially extend through aforesaid rotational armature and each aforesaid end closure structure;

a rotational shaft support bearing secured in each aforesaid end closure structure with each said rotational shaft support bearing proportioned and aligned to radially and axially constrain aforesaid rotational shaft on a rotational axis concentric with the bore axis of aforesaid containment cylinder;

a radial vane anchor sleeve concentrically secured on aforesaid rotational shaft and configured to feature one pivotal hinge component integrally secured at each of twelve centers equally distributed around its periphery and with each said pivotal hinge component mechanically connected to the innermost edge of one aforesaid radial vane extension;

an axial seal ring installed at each axial end of aforesaid rotational armature with the outer diameter of said axial seal ring proportioned to make a sliding fit with the bore of aforesaid containment cylinder, its radial face width proportioned to close the axial ends of aforesaid radial vane slots, and with an axially extended rim flange integrally secured on its outer periphery;

an axial retainer ring coaxially secured on each aforesaid rotational armature extension with the outer diameter of said axial retainer ring proportioned to maintain a small clearance with the inner surface of the rim flange of aforesaid axial seal ring and with an axially extended rim flange on its inner periphery.

a wear ring installed on each opposing face of each aforesaid axial retainer ring with the outer diameter of said wear ring proportioned to maintain a sliding fit with the inner surface of the rim flange of aforesaid axial seal ring and its inner diameter proportioned to maintain a small clearance with the outer periphery of aforesaid rotational armature extension an axial compression spring axially installed between each aforesaid wear ring and each aforesaid axial seal ring and with the inner diameter of said axial compression spring proportioned to maintain a sliding fit with the outer periphery of aforesaid rotational armature extension, its outer diameter proportioned maintain a small clearance with the inner surface of the rim flange of aforesaid axial seal ring, and with its linear extension and spring rate proportioned to resiliently maintain axial contact between aforesaid wear ring and aforesaid axial retainer ring;

a combustion air system with power supply configured and proportioned to deliver atmospheric air for combustion within the machine assembly;

a cooling air system with power supply configured and proportioned to deliver atmospheric air for thermal control within the machine assembly;

a fuel system with power supply configured and proportioned to deliver liquid or gaseous fuel for combustion within the machine assembly;

a lubricant system with power supply configured and proportioned to deliver liquid lubricant to all dynamic component interfaces;

a rotational starting device with external power supply configured and proportioned to initiate rotation of aforesaid rotational shaft;

a fuel ignition system with external power supply configured and proportioned to initiate combustion.

* * * * *